United States Patent [19]

Bellisio

[11] 4,354,054

[45] Oct. 12, 1982

[54] CABOOSE SIGNAL CONTROLLED REPORTING ARRANGEMENT FOR A REGENERATOR CHAIN

[75] Inventor: Jules A. Bellisio, Wall Township, Monmouth County, N.J.

[73] Assignee: Bell Telephone Laboratories, Incorporated, Murray Hill, N.J.

[21] Appl. No.: 254,914

[22] Filed: Apr. 16, 1981

[51] Int. Cl.$^3$ .......................... H04J 3/08; H04B 3/46
[52] U.S. Cl. ............................. 178/3; 179/175.31 R; 370/86
[58] Field of Search ................ 178/2 R, 2 C, 2 D, 3; 179/175.31 R; 328/164, 59; 370/13, 94, 86, 43

[56] References Cited

U.S. PATENT DOCUMENTS 3,870,838 3/1975 Corwin et al. .............. 179/175.31 R
3,904,829 9/1975 Martin et al. .......................... 370/86

Primary Examiner—Thomas A. Robinson
Attorney, Agent, or Firm—Richard B. Havill

[57] ABSTRACT

A status reporting arrangement for a digital transmission system (10) has a plurality of stations (11, 12, 13) in a tandem configuration. Each station (such as 11) includes a reporting circuit (30) arranged for receiving (36) a train of messages (91, 96), each message originating from a different preceding station (such as 13 and 12) in the tandem configuration, followed by a received caboose signal (97). Each reporting circuit responds in turn to the train of messages and the received caboose signal by retransmitting (60) the train of messages (91, 96) but deletes the received caboose signal (97). The reporting circuit, in response to detection of the received caboose signal, appends to the retransmitted train of messages a message (100) from the local station and a new caboose signal (102).

5 Claims, 4 Drawing Figures

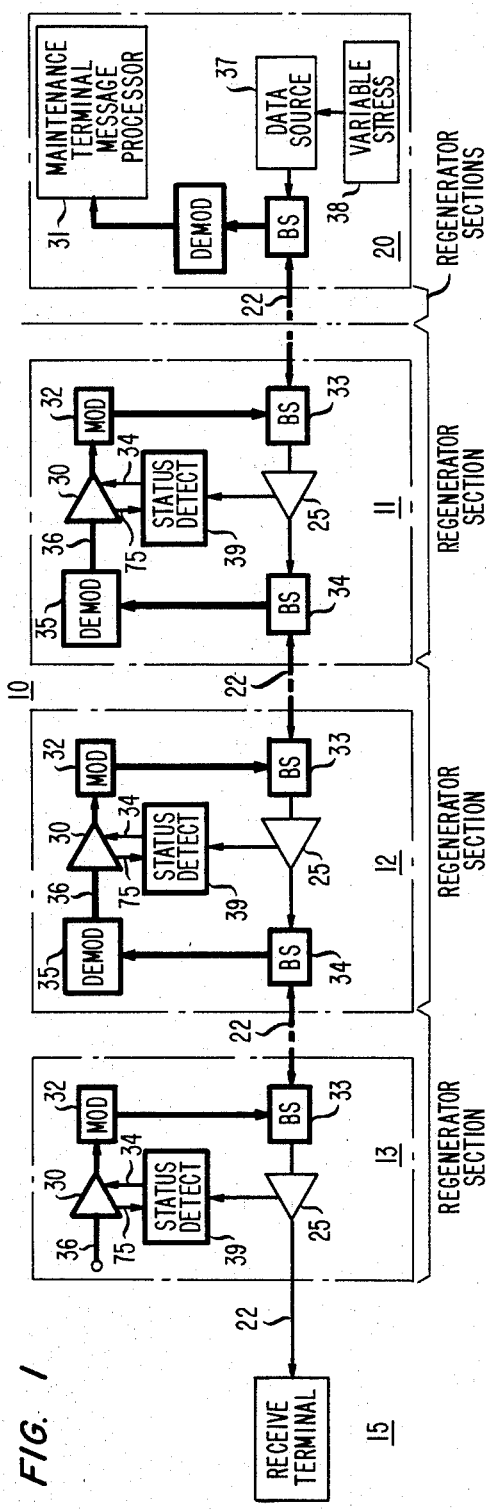
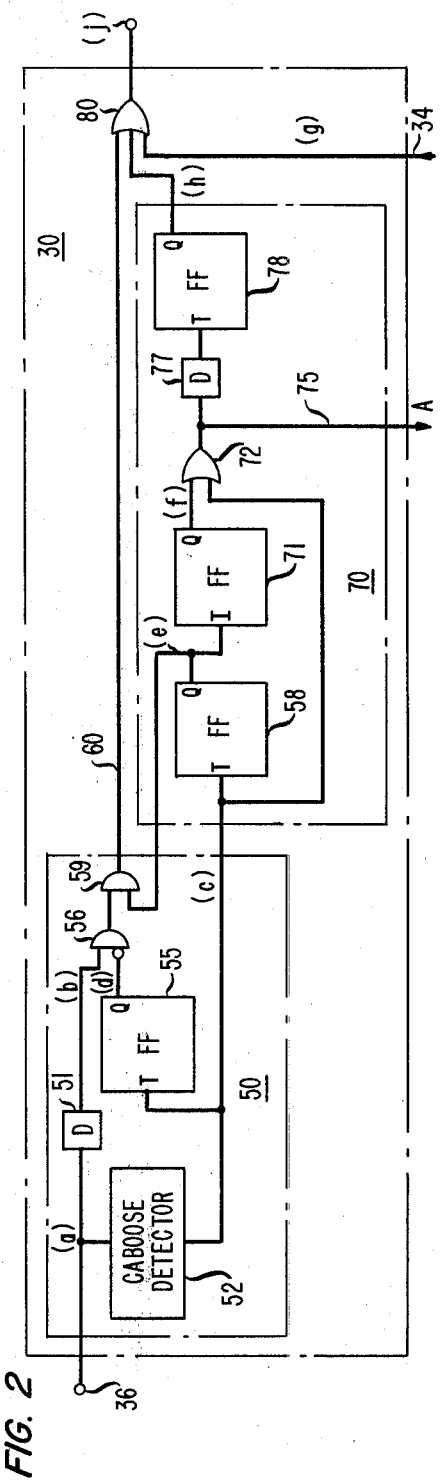
FIG. 1
FIG. 2

CABOOSE SIGNAL CONTROLLED REPORTING ARRANGEMENT FOR A REGENERATOR CHAIN

The invention relates to a performance monitoring system that is more particularly described as a reporting arrangement for a regenerator chain.

BACKGROUND OF THE INVENTION

Techniques for automatically monitoring the performance of a chain of regenerators are known in the art. Sequential addressing systems and random addressing systems have been used for accessing information from remote regenerator stations. Some performance monitoring systems include remote station equipment, each station equipment having a unique feature which distinguishes it from every other station equipment. There is a disadvantage to such systems because each remote station equipment must be different than every other remote station equipment.

A problem with such a system is that the different station equipments escalate the costs of implementing and operating the system. This problem can be solved by devising an arrangement of automatic performance monitoring circuits for remote stations wherein all of the performance monitoring circuits are alike.

SUMMARY OF THE INVENTION

This problem is solved by an automatic status reporting arrangement for a digital transmission system having a plurality of stations in a tandem configuration, wherein each station includes a reporting circuit arranged for receiving a train of messages, each message originating from a different preceding station in the tandem configuration, followed by a received caboose signal. Each reporting circuit responds in turn to the train of messages and the received caboose signal by retransmitting the train of messages while deleting the received caboose signal. The reporting circuit, in response to detection of the received caboose signal, appends to the retransmitted train of messages a message from the local station and a new caboose signal.

BRIEF DESCRIPTION OF THE DRAWINGS

The subject invention may be more readily understood by reference to the following detailed description when that description is read with reference to the attached drawings wherein FIG. 1 is a block diagram of a digital transmission system having a plurality of stations in a tandem configuration;

FIG. 2 is a logic schematic of a reporting circuit for the stations of the digital transmission system of FIG. 1;

DETAILED DESCRIPTION

Figure 3:
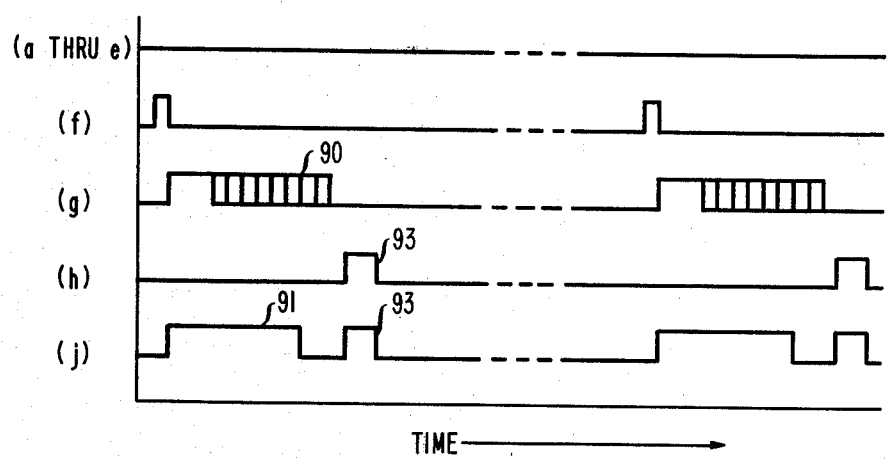
FIG. 3 is a timing diagram which shows some waveforms on nodes in the reporting circuit of FIG. 2 when it operates while receiving neither a train of data messages nor a caboose signal.

Referring now to FIG. 1, there is shown a digital transmission system 10 including stations 11, 12 and 13 arranged in tandem for transmitting a stream of data from a transmitting terminal 20 at the right to a receiving terminal 15 at the left. The stream of data is transmitted via a transmission media 22 from the transmitting terminal 20 through the first several stations (not shown); from those stations through stations 11, 12 and 13; and from the last station 13 to the receiving terminal 15. For high-speed transmission, a suitable transmission medium may be a coaxial cable. Although only the three stations 11, 12 and 13 are shown in detail in FIG. 1, more stations may be included in the system, as mentioned. Such additional stations are indicated by the dashes in the transmission medium 22 between the transmitting terminal 20 and the station 11.

Each of the stations 11, 12 and 13 includes a line regenerator 25 and a reporting circuit 30. All of the line regenerators are designed to detect pulses received via the transmission medium 22 and a band splitting circuit 33, to retime and amplify the detected pulses into a regenerated output pulse stream. In the stations 11 and 12, the regenerated pulse stream passes through another band splitting circuit 34 to the next cable section. From the regenerator 25 in the station 13, the data pulse stream is transmitted directly over the transmission medium 22 to the receiving terminal 15. Transmission of this data pulse stream proceeds in a forward direction from the transmitting terminal 20 at the right through the several cable sections and regenerators to the receiving terminal 15 at the left.

When the forward direction data pulse stream is being transmitted or while it is interrupted and the transmission system out of service, the operational status of the regenerators and cable sections can be ascertained by applying audio stressing signals to the line of regenerators. A status detection circuit 39 associated with each station produces a status message that is reported back to a maintenance terminal message processor 31 for indicating the status of that station. A suitable status detection circuit is described in a copending patent application Ser. No. 254,915, entitled "Error and Status Detection Circuit for a Digital Regenerator Using Quantized Feedback" and filed by W. L. Corwin concurrently herewith.

Reporting circuits 30 can transmit a train of those messages in the reverse direction from the leftmost station 13 to the transmitting terminal 20 at the right wherein the train of messages is analyzed by the maintenance terminal message processor 31. The messages transmitted from one reporting circuit to another are transmitted out of the reporting circuit 30 of the particular station through a modulator 32, the band splitter 33, the transmission medium 22, another band splitter 34, a demodulator 35 and an input lead 36 to the reporting circuit 30 of the next station.

In each station the local station status message is applied from the status detection circuit 39 to its associated reporting circuit 30 by way of a lead 34. Depending upon the operating condition of its input cable section and the regenerator 25 itself, the regenerator produces an output that is responsive to signals from a data source 37, as modified by stressing signals from a variable stressing source 38. Generally the regenerators satisfactorily regenerate those signals. If the regenerator is operating with a low margin, however, it causes error bursts which are detected by its associated error detection circuit 39, which is arranged to produce a pulse-width coded message on the lead 34 to indicate the status of that regenerator and cable section.

In one digital transmission system, the channel used by the reporting system is a channel in the unused frequency band of the same coaxial cable 22 that is used for the forward direction digital transmission. This reporting system is designed for determining the status of the line regenerators and the interconnecting cable of the digital transmission system by using audio tone stress testing. Recovered audio signals, used in the performance monitoring operation, are detected in one of the status detection circuits 39 at a time and are coded therein into the previously mentioned pulse-width coded message form, which is suitable for transmission through the local reporting circuit 30 and the rest of the reporting system to the maintenance terminal message processor 31.

Although the description herein describes pulse-width coding of the status messages, the underlying caboose reporting scheme does not depend upon pulse-width coding. Other coding schemes can be used readily for encoding the status messages to be applied by way of the lead 34 to the local reporting circuit 30.

Except for the first reporting circuit 30 at the station 13 and while all regenerators and cable sections are operable, each reporting circuit receives by way of a lead 36 a train of messages, one message from each operating station located at its left, followed by a received caboose signal. Each reporting circuit, upon receiving the train of messages and the received caboose signal, retransmits the train of messages, deletes the received caboose signal and appends its own local message and a new caboose signal to the train of messages.

The reporting circuit operates alternatively in either one of two modes. As previously mentioned, in a slave mode it receives and retransmits the train of messages deleting the received caboose signal, adding a message from the local station and appending the new caboose signal. In a master mode, the reporting circuit does not receive an input train of messages either because it is the first reporting circuit in the performance monitoring system, as in the station 13, or because there is a failure in the adjacent section of cable to the left or in the adjacent station to the left.

In FIG. 1 station 13 includes the first reporting circuit in the performance monitoring system. As shown, there is no input connection to the line 36 of that reporting circuit. Thus there is neither an input train of messages nor a received caboose signal applied to the line 36 of the reporting circuit 30 of station 13. This reporting circuit therefore operates in the master mode. As such the circuit initiates the generation of a status message by its status detection circuit 39, transmits that message from the local station and appends a caboose signal following the status message. This status message followed by the caboose signal will be generated and transmitted periodically.

FIG. 2 shows a typical reporting circuit 30. Like reporting circuits are used in all stations. Although not specifically shown in FIG. 2, operating power is supplied to the circuit 30 from the local station power supply. Operation in the master mode can be understood best by reference to FIG. 3 which presents waveforms produced at various circuit nodes. Those waveforms are identified by lower case letters which correlate with the same letters shown on the circuit nodes in FIG. 2. The waveform, identified by any letter in FIG. 3, is produced on the circuit node identified by the same letter in FIG. 2.

This master mode of operation occurs when the reporting circuit 30 receives no input message nor the received caboose signal for a long period of time. For the instant example, the reporting circuit 30 of station 13 never receives an input message nor a caboose signal because it is the first reporting circuit in the system and nothing is connected to the input data lead 36.

As shown in FIG. 3, the waveform on the node (a) is the received input waveform and is represented by an all zeros signal, indicating an absence of the input message and an absence of the caboose signal. In the reporting circuit of FIG. 2, this all zeros signal is applied to a detection circuit 50 that includes a delay circuit 51 which produces another all zeros signal on the node (b), as shown in FIG. 3.

An input to a caboose signal detector 52 is connected to the node (a) for detecting the presence or absence of any received caboose signal. The caboose signal detector 52 is a short pulse detection circuit. Since the expected received caboose signal is absent, the output of the caboose detector 52 is low. This low level signal is produced on the node (c). A monostable multivibrator 55 having an input T connected to the node (c) is not triggered and therefore maintains an all zeros output signal on the node (d). The signal on the node (d) is transmitted to an input of an AND gate 56. Because this is an inverted input to the AND gate 56, that gate is conditioned for turn on by the all zeros signal on the node (d). Since there is no train of messages at the node (b) connected to the other input of the AND gate 56, an all zeros signal also is produced at the output of the AND gate 56.

A caboose signal and local status message initiator circuit 70 is included in the reporting circuit 30. The node (c) of the detection circuit 50 interconnects with the caboose signal and local status message initiator circuit 70. A monostable multivibrator 58 in the circuit 70 is not triggered by the all zeros signal on the node (c) and therefore maintains an all zeros output at the node (e). Whenever there are no received caboose signals being detected by the caboose detector 52, the output of the monostable multivibrator 58 on the node (e) remains low. This output on the node (e) and the output of the AND gate 56 are applied as the inputs of an AND gate 59. The low signal on the node (e) disables the AND gate 59 from transmitting any positive pulses. Thus when there is no caboose signal received on the lead 36, there is no train of messages regenerated on a message train lead 60 at the output of the AND gate 59 and of the detection circuit 50.

An oscillator 71 having an input connected to the node (e) is enabled to generate a repetitive series of clock pulses on the node (f), as shown in FIG. 3. The duration between pulses is sufficiently long so that all of the stations in the transmission system 10 can put their status messages together serially in a single train of messages in the duration between the clock pulses. This series of clock pulses at the node (f) is applied to an input of an OR gate 72. That OR gate produces a high signal A for each of the clock pulses. This periodic high signal A from the OR gate 72 is applied through a lead 75 to the status detection circuit 39 of FIG. 1 for initiating generation of a local station status message. The signal A applied to the status detection circuit 39 enables the generation and transmission of the status message from the status detection circuit 39 of the local station 13 through the lead 34 and the node (g) to an output OR gate 80, as shown in FIGS. 1 and 2.

When enabled, the status detection circuit 39 produces on the lead 34 an analog voltage which appears as a pulse having a width that is representative of the operational status of the station 13. As shown in FIG. 3, the status detection circuit 39 generates a pulse-width modulated signal 90 on the node (g) as the local station status message. Just one pulse width of several possible pulse widths is generated. The output OR gate 80 responds to the selected pulse-width modulated signal 90 on the node (g) and reproduces it as an output signal, or local status message 91, on an output node (j). This local station status message 91 is transmitted to the next reporting circuit located at the station 12 in FIG. 1.

A delay circuit 77 and a caboose signal generator 78 are connected to respond to the output of the OR gate 72. After occurrence of the signal A followd by a time period determined by the delay circuit 77, the caboose signal generator 78 produces a caboose signal 93 on the node (h). The caboose signal generator 78 is triggered by a delayed version of the same high periodic signal A that initiates the production of the local station status message by the status detection circuit 39. The period of delay is longer than the longest pulse width expected from the status detection circuit 39.

As shown in FIG. 3, the caboose signal 93 produced by the caboose generator 78 is different from any signal expected from the status detection circuit 39 and has been selected to be a pulse having a shorter pulse width than the shortest pulse-width signal expected from the status detection circuit. This caboose signal is applied to another input of the output OR gate 80. As a result the caboose signal 93 is appended to the data stream following the termination of the local status message 91 produced on the output node (j) of the reporting circuit 30 of FIG. 2.

In FIG. 1, the output of the reporting circuit 30 is applied to the modulator 32 for modulation into a pulse code signal suitable for transmission through the reverse channel. From the modulator 32 in station 13, the pulse code signal is coupled through the band splitter 33 and the cable 22 to the band splitter 34 and the demodulator 35 in the station 12. Demodulator 35 demodulates the pulse code signal back into a pulse-width code for application over the lead 36 to the input of the reporting circuit 30 of the station 12.

By way of the lead 36 in the station 12, the reporting circuit 30 receives the status message 91 and the appended caboose signal 93, shown in FIG. 3 and being generated on the node (j) of the reporting circuit 30 of the station 13. Thus an input, or received, message 91 and a received caboose signal 93 are applied to the node (a) in the reporting circuit 30 of station 12. As a result this reporting circuit operates in the slave mode wherein it receives and regenerates the received message 91, detects and deletes the received caboose signal 93, appends a status message from the local station 12 and a new caboose signal for transmission to the next reporting circuit located at station 11. This slave mode operation occurs in each succeeding reporting circuit to the right in the system.

The same reporting circuit 30 of FIG. 2 is used in the stations 12, 11, etc. as in the station 13. Operation of the reporting circuit 30 in the slave mode is understood best by reference to FIG. 4 which presents waveforms produced at circuit nodes of FIG. 2, which are identified by the several lower case letters.

Figure 4:
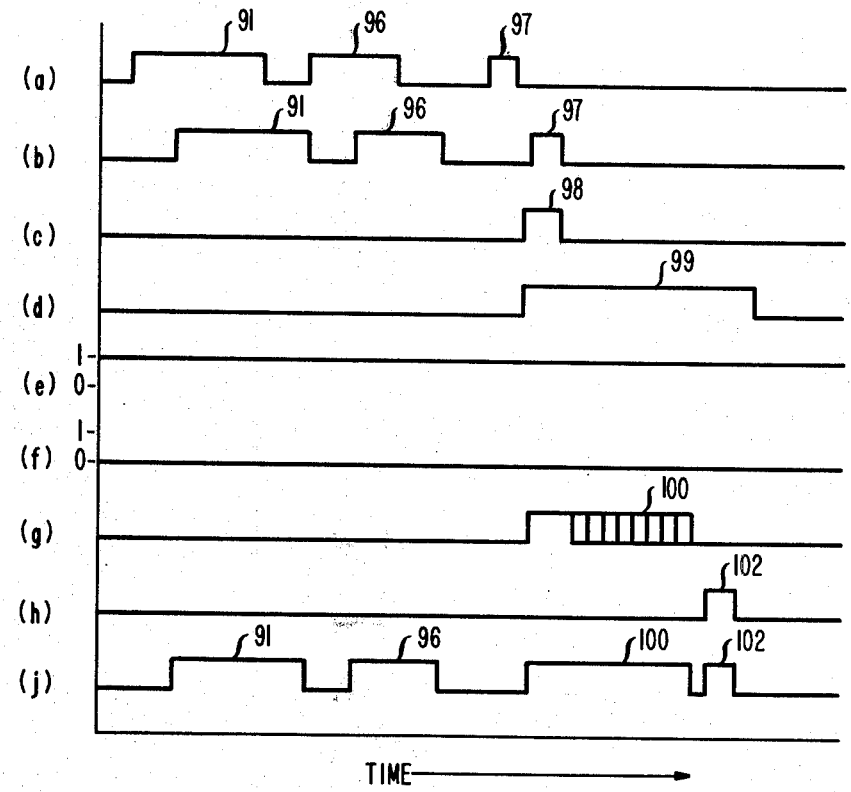
FIG. 4 is a timing diagram which shows some waveforms on nodes in the reporting circuit of FIG. 2 when it operates while receiving a train of data messages and a caboose signal.

The waveforms shown in FIG. 4 are selected to represent the operation of the performance monitoring system at the intermediate station 11 which is receiving messages from the station 12. A train of messages 91 and 96 has been put together in FIG. 4. Message 91 represents the operational status of the station 13. Message 96 represents the operational status of the station 12. A caboose signal 97, generated by the reporting circuit of the station 12, is shown appended after the message 96. The two message train of data followed by the received caboose signal 97 is represented by the waveform (a) in FIG. 4 and is applied by way of the lead 36 to the input node (a) of the reporting circuit 30 of FIG. 2.

As the train of two messages 91 and 96 and the received caboose signal 97 is applied to the node (a) of FIG. 2, the two message signals and the received caboose signal will be delayed by the delay circuit 51 and reproduced on the node (b), as shown in FIG. 4. At this time prior to the termination of the first caboose signal received on the node (a), the flip-flop 55 of FIG. 2 remains reset producing a low level output signal on the node (d). The AND gate 56 thereby is conditioned for transmitting the received train of messages to the input of the AND gate 59. In accordance with further explanation to be given subsequently, the monostable multivibrator 58 is in its set condition producing a high level on the node (e) enabling transmission of the received messages through the AND gate 59 onto the input lead 60 of the output OR gate 80, which passes the messages to the output node (j).

This train of messages and the received caboose signal on the node (a) also are applied to the caboose detector circuit 52, the short pulse detection circuit. In response to detection of the received caboose signal, the circuit 52 produces a high level output signal 98 on the node (c), as shown in FIG. 4. Because circuit 52 is a short pulse detection circuit, the high-level signal on the node (c) commences after termination of the caboose pulse 97 on the node (a). The high-level signal 98 on the node (c) now sets the monostable multivibrator 55 which then produces a high-level output signal 99 on the node (d). The signal 99 also commences after termination of the caboose signal 97 on the input node (a).

The high-level signal 99 on the node (d) deletes the received caboose signal. Duration of the delay imposed by the delay circuit 51 is chosen to be longer than the pulse width of the caboose signal 97 so that the received caboose signal appearing on the node (b) commences after the signal 99 on the node (d) goes to its high level. This high-level signal from the multivibrator 55 on the node (d) disables the AND gate 56 commencing before the rising edge of the delayed caboose signal on the node (b) occurs. Since the monostable multivibrator 55 retains its high-level output until after termination of the caboose signal on the node (b), the entire caboose signal 97 is blocked from passing through the AND gate 56. Thus the received caboose signal 97 is deleted from its position following the received train of messages and is not transmitted over the lead 60 to the output OR gate 80.

The high-level output signal 98, produced by the caboose detector 52 on the node (c) and resulting from detection of the received caboose signal, causes other operations to occur in the caboose signal and local status message initiator circuit 70. In response to the high-level output signal 98 on the node (c), the monostable multivibrator 58 is set and therefore produces a high-level signal on the node (e). This high-level signal on the node (e) inhibits the oscillator 71 from generating any output pulses on the node (f). The high-level output signal on the node (c) also passes through the OR gate 72 producing a similar high-level signal A which initiates the generation of a local station status message 100, shown in FIG. 4. This local station status message is generated by the local status detection circuit 39 of the local station 11. The local station status message, a pulse-width modulated signal, is applied to the reporting circuit 30 through the lead 34 and the node (g) to the output OR gate 80. This status message 100 arrives on the node (g) at the input to the OR gate 80 at a time following the last message 96 of the regenerated train of messages 91 and 96 after that train of messages has passed through the OR gate 80. The train of messages including the messages 91 and 96 are produced at the output node (j) now has the local status message 100 appended to the received train of messages following the message 96. This train of messages is shown on the line (j) in FIG. 4. Thus the output OR gate 80 combines sequentially the regenerated train of received messages and the local message, as shown in FIG. 4.

The high-level signal produced by the OR gate 72 is delayed by the delay circuit 77 before it is applied to the input of the caboose signal generator 78. The delay time is sufficiently long to allow transmission on the node (j) of the local status message 100 from the local station 11. After the local status message is transmitted, the caboose generator 78 is triggered to produce a new caboose signal 102 on the node (h), which is also applied as an input to the OR gate 80. At node (j) this new caboose signal 102 is appended to the regenerated train of messages 91 and 96 following the local station status message 100, as shown on the line (j) of FIG. 4.

The foregoing describes the receipt of a received train of status messages accompanied by a received caboose signal. In response, the reporting circuit 30 at the station 11 has regenerated the train of messages, deleted the received caboose signal and appended to the regenerated train of messages a message from the local station followed by a new caboose signal. This regenerated train of messages 91 and 96, the local station message 100 and the new caboose signal 102 are applied by way of the node (j) of FIG. 2 and the modulator 32, the band splitter 33 and the reporting channel of the transmission medium 22 in FIG. 1 to the next subsequent station in the performance monitoring system.

In this tandem arrangement of the performance monitoring system, the train of messages proceeds from one station to the next until it reaches the maintenance terminal message processor 31, shown in FIG. 1. The reporting circuit at each station of the performance monitoring system deletes the received caboose signal, retransmits the received train of messages, and appends its local station status message and a new caboose signal.

If a caboose signal is not received and detected by the caboose detector 52, the monostable multivibrator 58 remains reset producing a low-level output signal which disables the AND gate 59. As a result the received train of messages is not transmitted by way of the lead 60 to the OR gate 80. Generation of the local station status message, however, is initiated by the output of the oscillator 71 which is coupled through the OR gate 72 to the status detection circuit 39. The local station status message is transmitted through the output OR gate 80. A caboose signal is appended following that message.

Maintenance terminal message processor 31 is arranged to analyze the messages in the received train for determining the status of each regenerator having a message in the train. Operating margin of each regenerator can be encoded in its status message. A complete failure in any section can be determined from the number of messages received by the maintenance terminal processor. Identification of the regenerator associated with each message is determined from the reverse order in which the messages are received by the maintenance terminal message processor 31.

Because it is advantageous to build all of the reporting circuits similar to one another, there are some special timing considerations. The period between pulses generated by the oscillator 71 on the node (f) is long enough to accommodate all of the messages from all of the stations in the transmission system. While the intermediate station reporting circuits are operating in the slave mode, they remain in the slave mode continuously. Therefore the interval of the monostable multivibrator 58 is greater than the period between pulses produced by the oscillator 71. Thus when a reporting circuit receives repetitively a train of messages and a caboose signal, the monostable multivibrator 58 is set upon detection of the first caboose signal. Thereafter it is periodically set by subsequently detected received caboose signal. The signal on the node (e) therefore goes high upon detection of the first received caboose signal and remains high as long as other caboose signals are received periodically. As a result, the high level signal on the node (e) continuously enables the AND gate 59 to transmit repetitive trains of received messages. The interval of the monostable multivibrator 55 is long enough to disable the AND gate 56 while the message from the local station and the new caboose signal are appended to the train of messages.

The foregoing describes the arrangement and operation of an illustrative embodiment of the invention. Other embodiments thereof are within the skill of the art. The described embodiment together with those other embodiments are considered to be within the scope of the invention.

What is claimed is:

1. A status reporting arrangement for a digital transmission system (10) having a plurality of stations (11, 12, 13) arranged in a tandem configuration and arranged for reporting status information from the stations to a terminal (20), the system BEING CHARACTERIZED BY each station (such as 11) including a reporting circuit (30) arranged for receiving (36) a train of messages (91, 96) followed by a received caboose signal (97);

means (50), included in each reporting circuit and responsive to the train of messages and the received caboose signal, for retransmitting (60) the train of messages (91, 96) and for detecting (52) and deleting (55) the received caboose signal (97);

means (70, 80), included in each reporting circuit and responsive to detection of the received caboose signal, for appending to the retransmitted train of messages a message (100) from the local station and a new caboose signal (102);

the means (50) further including means for detecting the absence of the caboose signal for a predetermined period and producing a caboose absent signal as a result thereof; and the means (70, 80) further including means responsive to the caboose absent signal for transmitting a message (91) from the local station followed by a caboose signal (93).

2. A status reporting arrangement for a digital transmission system (10) having a plurality of stations (11, 12, 13) arranged in a tandem configuration and arranged for reporting status information from the stations to a terminal (20), the system BEING CHARACTERIZED BY a first station (13) including a reporting circuit (30) arranged for receiving (36) a train of received message signals followed by a received caboose signal;

means (50), included in the reporting circuit and responsive to received signals, for detecting and producing a first signal indicating the presence of the received caboose signal and for detecting and producing a second signal indicating the absence of the received caboose signal; and means (70, 80), included in the reporting circuit (30) and responsive to the second level signal, for transmitting a message (91) from the first station with an appended caboose signal (93).

3. A status reporting arrangement for a digital transmission system (10) having a plurality of stations (11, 12) arranged in a tandem configuration between end terminals (15, 20) and arranged for reporting status information from the stations to one of the terminals (20), the system BEING CHARACTERIZED BY each station (such as 11) including a status reporting circuit (30), the status reporting circuit of each of the plurality of stations being alike, each status reporting circuit (30) including means for receiving (36) a train of messages (such as 91, 96), each message originating from a different preceding station (such as 13 and 12) in the tandem configuration, followed by a received caboose signal (97);

means (50), included in each reporting circuit and responsive to the train of messages and the received caboose signal, for retransmitting (60) the train of messages (91, 96) and for detecting (52) and deleting (55) the received caboose signal;

means (70, 80), included in each reporting circuit and responsive to detection of the received caboose signal, for appending to the retransmitted train of messages a message (100) from the local station and a new caboose signal (102);

the means (50) further including means for detecting the absence of the caboose signal for a predetermined period and producing a caboose absent signal as a result thereof; and the means (70, 80) further including means responsive to the caboose absent signal for transmitting a message (91) from the local station followed by a caboose signal.

4. A status reporting circuit arranged for receiving (36) a train of messages (91, 96) followed by a received caboose signal (97), the circuit comprising means (50), responsive to the train of messages and the received caboose signal, for retransmitting (60) the train of messages (91, 96) and for detecting (52) and deleting (55) the received caboose signal (97);

means (70, 80), responsive to detection of the received caboose signal, for appending to the retransmitted train of messages a locally generated message (100) and a new caboose signal (102);

the means (50) further including means for detecting the absence of the caboose signal for a predetermined period and producing a caboose absent signal as a result thereof; and the means (70, 80) further including means responsive to the caboose absent signal for transmitting a message (91) from the local station followed by a caboose signal.

5. A status reporting circuit arranged for receiving (36) a train of messages (91, 96) followed by a received caboose signal (97), the circuit comprising means for receiving (36) a train of message signals followed by a caboose signal;

means (50) for detecting the absence of a caboose signal for a predetermined period and for producing a caboose absent signal as a result thereof; and means (70, 80) responsive to the caboose absent signal for transmitting a locally generated message (91) followed by a caboose signal (93).

* * * * *